(12) United States Patent
Yiu et al.

(10) Patent No.: US 9,854,591 B2
(45) Date of Patent: Dec. 26, 2017

(54) DEVICE, SYSTEM AND METHOD OF CELL SPECIFIC PROBABILITY LOAD BALANCING

(71) Applicant: Intel IP Corporation, Santa Clara, CA (US)

(72) Inventors: Candy Yiu, Portland, OR (US); Nithin Srinivasan, Hillsboro, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/859,633

(22) Filed: Sep. 21, 2015

(65) Prior Publication Data

US 2016/0302118 A1 Oct. 13, 2016

Related U.S. Application Data

(60) Provisional application No. 62/145,394, filed on Apr. 9, 2015.

(51) Int. Cl.
*H04W 36/22* (2009.01)
*H04W 72/08* (2009.01)
(Continued)

(52) U.S. Cl.
CPC ......... *H04W 72/082* (2013.01); *H04W 36/22* (2013.01); *H04W 48/16* (2013.01);
(Continued)

(58) Field of Classification Search
CPC ............. H04W 36/0061; H04W 36/22; H04W 36/0083; H04W 84/045; H04W 36/06;
(Continued)

(56) References Cited

U.S. PATENT DOCUMENTS 8,270,374 B2 9/2012 Cai et al.
8,886,184 B2 11/2014 Cho et al.
(Continued)

FOREIGN PATENT DOCUMENTS

WO WO-2016164095 A1 10/2016

OTHER PUBLICATIONS

"International Application Serial No. PCT/US2016/015282, International Search Report dated May 19, 2016", 5 pgs.
(Continued)

*Primary Examiner* — Allahyar Kasraian
(74) *Attorney, Agent, or Firm* — Schwegman Lundberg & Woessner, P.A.

(57) ABSTRACT

An eNodeB (eNB), user equipment (UE) and method of cell reselection are generally described. While in Radio Resource Control (RRC) Idle mode, the UE may receive via a system information broadcast a cell reselection probability and a cell-specific priority list including a list of neighboring eNBs and their priorities for both macro and small cells operating on at least one frequency different from that of the serving eNB. The UE may generate a random number and compare the random number to the cell reselection probability to determine whether the UE is to reselect. The UE may randomly select among eNBs that have the same, highest priority. The UE may receive a predetermined set of cell reselection criteria from the eNB via a system information broadcast to determine whether or not to perform reselection.

19 Claims, 13 Drawing Sheets

(51) Int. Cl.
  *H04W 76/04* (2009.01)
  *H04W 48/16* (2009.01)
  *H04W 48/20* (2009.01)
  *H04W 84/04* (2009.01)

(52) U.S. Cl.
  CPC .......... *H04W 76/046* (2013.01); *H04W 48/20* (2013.01); *H04W 84/045* (2013.01)

(58) Field of Classification Search
  CPC ..... H04W 36/32; H04W 72/00; H04W 72/04; H04W 72/0453; H04W 72/1252
  USPC ........................... 455/436–444; 370/331–333
  See application file for complete search history.

(56) References Cited

U.S. PATENT DOCUMENTS

| | | | |
|---|---|---|---|
| 2007/0123265 A1 | 5/2007 | Moon | |
| 2008/0227447 A1* | 9/2008 | Jeong | H04W 48/10 455/434 |
| 2011/0211560 A1* | 9/2011 | Yamamoto | H04W 36/20 370/332 |
| 2012/0250548 A1 | 10/2012 | Swaminathan et al. | |
| 2012/0282931 A1* | 11/2012 | Giustina | H04W 36/22 455/437 |
| 2013/0022016 A1* | 1/2013 | Wei | H04L 5/0007 370/329 |
| 2013/0107864 A1* | 5/2013 | Lee | H04W 36/0072 370/331 |
| 2013/0203410 A1 | 8/2013 | Gandhi et al. | |
| 2014/0044003 A1* | 2/2014 | Drazynski | H04W 24/10 370/252 |
| 2014/0098682 A1* | 4/2014 | Cao | H04W 36/0083 370/252 |
| 2014/0213277 A1* | 7/2014 | Jang | H04W 28/08 455/453 |

OTHER PUBLICATIONS

"International Application Serial No. PCT/US2016/015282, Written Opinion dated May 19, 2016", 7 pgs.

\* cited by examiner

DEVICE, SYSTEM AND METHOD OF CELL SPECIFIC PROBABILITY LOAD BALANCING

PRIORITY CLAIM

This application claims the benefit of priority to U.S. Provisional Patent Application Ser. No. 62/145,394, filed Apr. 9, 2015, and entitled "CELL SPEC LOAD BALANCING," which is incorporated herein by reference in its entirety.

TECHNICAL FIELD

Embodiments pertain to radio access networks. Some embodiments relate to load balancing in cellular networks, including Third Generation Partnership Project Long Term Evolution (3GPP LTE) networks and LTE advanced (LTE-A) networks as well as $4^{th}$ generation (4G) networks and $5^{th}$ generation (5G) networks.

BACKGROUND

The use of personal communication devices has increased astronomically over the last several decades. The penetration of mobile devices in modern society has continued to drive demand for a wide variety of networked devices in a number of disparate environments. The sheer number of user equipment (UE) using Third Generation Partnership Project Long Term Evolution (3GPP LTE) and LTE advanced (LTE-A) systems may generate issues related to loading of cells to which the UEs are attached. These issues may be exacerbated as the UEs move frequently at high rates of speed in relation to the coverage area of the cell or when the UEs change mode en masse. Accordingly, it would be desirable to provide improved load sharing of UEs.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION OF THE INVENTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
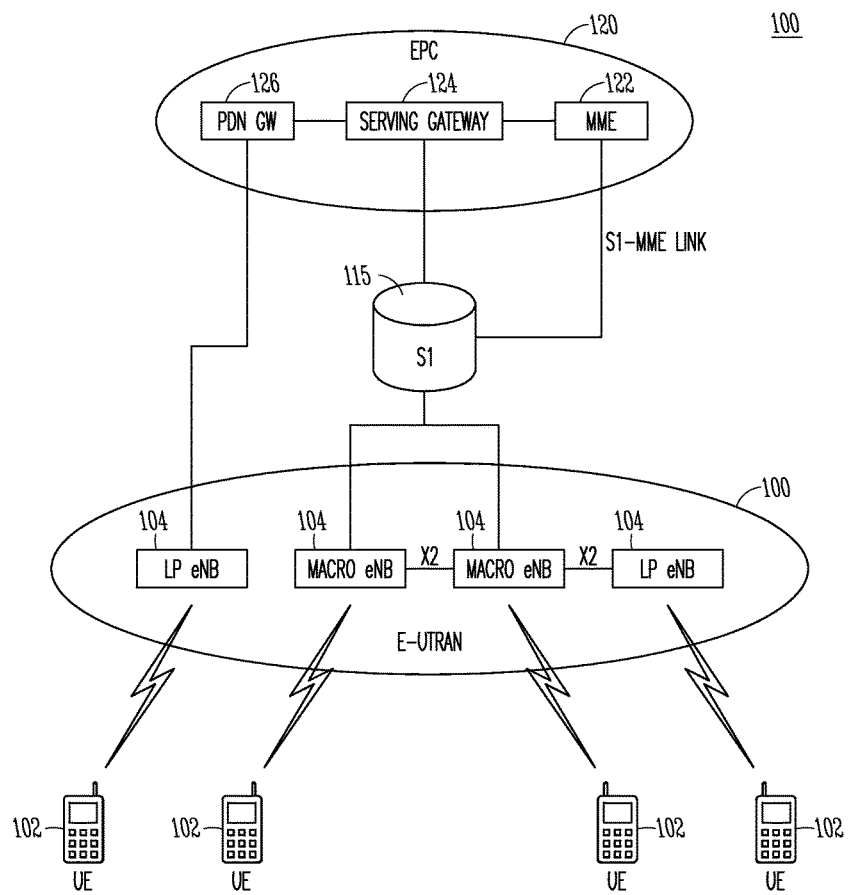
FIG. 1 is a functional diagram of a 3GPP wireless network in accordance with some embodiments.

FIG. 1 is a functional diagram of a wireless network in accordance with some embodiments. The network may be a 3GPP network, although the scope of the embodiments is not limited in this respect. As those skilled in the art will readily appreciate, various aspects described herein may be extended to other telecommunication systems, network architectures and communication standards. By way of example only, various aspects may be extended to other Universal Mobile Telecommunications System (UMTS) systems such as Time Division Synchronous Code Division Multiple Access (TD-SCDMA), High Speed Downlink Packet Access (HSDPA), High Speed Uplink Packet Access (HSUPA), High Speed Packet Access Plus (HSPA+) and Time-Division CDMA (TD-CDMA). Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), Institute of Electrical and Electronics Engineers (IEEE) 802.11 (Wi-Fi), IEEE 802.16 (WiMAX®), IEEE 802.20, Ultra-Wideband (UWB), Bluetooth, and/or other suitable systems. The actual telecommunication standard, network architecture, and/or communication standard employed will depend on the specific application and the overall design constraints imposed on the system. The network may comprise a radio access network (RAN) (e.g., as depicted, the E-UTRAN or evolved universal terrestrial radio access network) 100 and the core network 120 (e.g., shown as an evolved packet core (EPC)) coupled together through an S1 interface 115. For convenience and brevity sake, only a portion of the core network 120, as well as the RAN 100, is shown.

The core network 120 includes mobility management entity (MME) 122, serving gateway (serving GW) 124, and packet data network gateway (PDN GW) 126. The RAN 100 includes eNBs 104 (which may operate as base stations) for communicating with UE 102. The eNBs 104 may include macro eNBs and low power (LP) eNBs.

The MME is similar in function to the control plane of legacy Serving GPRS Support Nodes (SGSN). The MME manages mobility aspects in access such as gateway selection and tracking area list management. The serving GW 124 terminates the interface toward the RAN 100, and routes traffic packets (such as data packets or voice packets) between the RAN 100 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates a SGi interface toward the packet data network (PDN). The PDN GW 126 routes traffic packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102. The eNBs 104 may communicate both with UEs 102 in a normal coverage mode and UEs 104 in one or more enhanced coverage modes. In some embodiments, an eNB 104 may fulfill various logical functions for the RAN 100 including but not limited to RNC (radio network controller functions) such as radio bearer management, uplink and downlink dynamic radio resource management and traffic packet scheduling, and mobility management. In accordance with some embodiments, UEs 102 may be configured to communicate via orthogonal multiple access (OMA) communications such as Time Division Multiple Access (TDMA), Frequency Division Multiple Access (FDMA) Orthogonal FDMA (OFDMA), SC-FDMA or other communication signals with an eNB 104 over a multicarrier communication channel in accordance with the appropriate communication technique. The OFDM signals may comprise a plurality of orthogonal subcarriers. In accordance with some embodiments, UEs 102 may be configured to communicate via non-orthogonal multiple access (NOMA) signals.

The S1 interface 115 is the interface that separates the RAN 100 and the EPC 120. It is split into two parts: the S1-U, which carries traffic packets between the eNBs 104 and the serving GW 124, and the S1-MME, which is a signaling interface between the eNBs 104 and the MME 122.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

Communication over an LTE network may be split up into 10 ms frames, each of which may contain ten 1 ms subframes. Each subframe of the frame, in turn, may contain two slots of 0.5 ms. The eNB may schedule uplink and downlink transmissions over a variety of frequency bands. The allocation of resources in subframes used in one frequency band and may differ from those in another frequency band. Each slot of the subframe may contain 6-7 symbols, depending on the system used. In some embodiments, the subframe may contain 12 or 24 subcarriers. A resource grid may be used for downlink and uplink transmissions between an eNB and a UE. The resource grid may be a time-frequency grid, which is the physical resource in each slot. The smallest time-frequency unit in a resource grid may be denoted as a resource element (RE). Each column and each row of the resource grid may correspond to one OFDM symbol and one OFDM subcarrier, respectively. The resource grid may contain resource blocks (RBs) that describe the mapping of physical channels to resource elements and physical RBs (PRBs). A PRB may be the smallest unit of resources that can be allocated to a UE in the current 3GPP standard. A resource block may be 180 kHz wide in frequency and 1 slot long in time. In frequency, resource blocks may be either 12×15 kHz subcarriers or 24×7.5 kHz subcarriers wide. For most channels and signals, 12 subcarriers may be used per resource block, dependent on the system bandwidth. The duration of the resource grid in the time domain corresponds to one subframe or two resource blocks. Each resource grid may comprise 12 (subcarriers)*14 (symbols)=168 resource elements for normal cyclic prefix (CP) case. Several different physical channels may be conveyed using such resource blocks.

Figure 2:
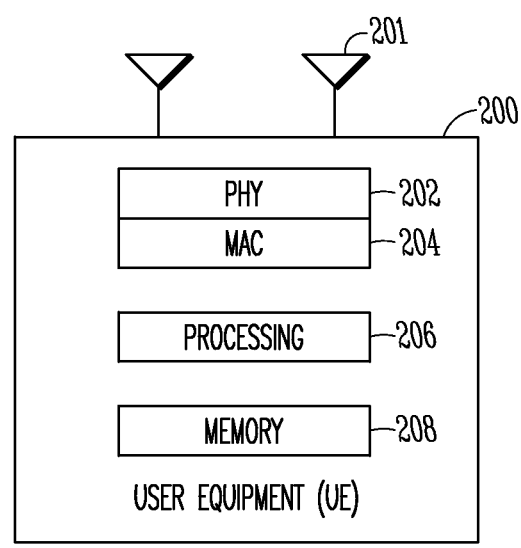
FIG. 2 is a block diagram of a 3GPP wireless device in accordance with some embodiments.

FIG. 2 is a functional diagram of a wireless device in accordance with some embodiments. The device may be a UE or eNB, for example. In some embodiments, the eNB may be a stationary non-mobile device. The 3GPP device 200 may include physical layer circuitry 202 for transmitting and receiving signals using one or more antennas 201. The 3GPP device 200 may also include medium access control layer (MAC) circuitry 204 for controlling access to the wireless medium. The 3GPP device 200 may also include processing circuitry 206 and memory 208 arranged to perform the operations described herein.

In some embodiments, mobile devices or other devices described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the mobile device or other device can be a UE 102 or eNB 104 configured to operate in accordance with 3GPP standards. In some embodiments, the mobile device or other device may be configured to operate according to other protocols or standards, including IEEE 802.11 or other IEEE standards. In some embodiments, the mobile device or other device may include one or more of a keyboard, a display, a non-volatile memory port, multiple antennas, a graphics processor, an application processor, speakers, and other mobile device elements. The display may be an LCD screen including a touch screen.

The antennas 201 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 201 may be effectively separated to take advantage of spatial diversity and the different channel characteristics that may result.

Although the 3GPP device 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

The term "machine readable medium" may include a single medium or multiple media (e.g., a centralized or distributed database, and/or associated caches and servers) configured to store one or more instructions. The term "machine readable medium" may include any medium that is capable of storing, encoding, or carrying instructions for execution by the 3GPP device 200 and that cause it to perform any one or more of the techniques of the present disclosure, or that is capable of storing, encoding or carrying data structures used by or associated with such instructions. The term "transmission medium" shall be taken to include any intangible medium that is capable of storing, encoding or carrying instructions for execution, and includes digital or analog communications signals or other intangible medium to facilitate communication of such software.

As above, load balancing among eNBs (also referred to herein as cells) is becoming increasingly important with the increasing multitude of UEs employed in all aspects of the modern life. One shortcoming of load balancing involves a large number of UEs that all transition from an idle mode to a connected mode. In an RRC Idle mode, there is no RRC connection established between the UE and the network, and thus data may not be communicated between the UE and eNB. The UE may decide to enter RRC Idle mode, for example, after being idle for a predetermined amount of time. In RRC Idle mode, the UE may perform neighbouring cell measurements, cell (re-) selection, and acquire system information in idle mode. In the RRC Connected mode, the UE may, for example, besides communicating with other UEs (either directly or through the network), monitor a paging channel and/or SIB Type 1 contents to detect a system information change and Earthquake and Tsunami Warning System (ETWS) notification, monitor control channels associated with the shared data channel to determine if data is scheduled for the UE, provide channel quality and feedback information and perform neighbouring cell measurements and measurement reporting for handover. The RRC Connected mode may have one or more states. For example, in UMTS embodiments, the UE may be in one of several states, including: a cell paging channel (CELL PCH) state, a Universal Terrestrial Radio Access Network (UTRAN) Registration Area (URA) paging channel (URA PCH) state or a forward access channel (CELL FACH) state.

Once the UE determines that it is to enter RRC Connection mode from RRC Idle mode, e.g., by being activated by a user or paged by the serving eNB, a series of control messages may be exchanged between the UE and the eNB prior to any user data being transmitted between the UE and the eNB. For LTE systems, a Non-Access Stratum (NAS) message (RRC Connection Request) may be used to initiate the RRC connection process. The eNB may respond with a RRC Connection Setup message to the UE. The UE may then transmit a RRC Connection Setup Complete to the eNB. For UMTS, the RRC connection process involves further control communications between the UE and eNB.

Thus, a not insignificant amount of control overhead is involved during transition of the UE from RRC Idle Mode to RRC Connected Mode. The amount of control messaging may further increase in the event that handover of the UE between eNBs (or other cells) is to occur when the UE transitions from RRC Idle Mode to RRC Connected Mode due to cell reselection when reselection criteria defined in 3GPP Technical Specification 36.304 is met.

The reselection process may involve a number of cells, which, whether currently serving or under-loaded, may be any type, as indicated above. For example, the cells may include large (macro) eNBs and small (e.g., mini, micro, nano) eNBs. The cells may also be associated with different frequencies or frequency bands for communications between the UE and the eNB. In some embodiments, the network may assign priorities to cells and/or frequencies used by the cells. Cells in overlapping geographical locations may be assigned similar or different frequencies (or frequency ranges). For example, small cells within a macro cell may communicate using similar frequencies. In some embodiments, cells of similar size may align geographically (essentially overlapping, e.g., no more than about 5% non-overlap) or may be offset to be in partial alignment.

The geographical overlap of cells operating over similar frequencies may lead to reselection issues if priority based on frequency alone is used. For example, if an under-loaded micro cell and an over-loaded overlapping macro cell operate over the same first frequency, some UEs reselecting from a different (over-loaded) cell operating on a different frequency from the first frequency may reselect the macro cell, thereby reselecting from one over-loaded cell to another over-loaded cell.

In another example, different under-loaded small cells may be associated with different frequencies. Adding to the above example in which one of the under-loaded small cells overlaps an over-loaded macro cell and operates over the first frequency, an over-loaded small cell may operate over the same frequency (a second frequency) as another under-loaded small cell but which is different from the first frequency. Assuming that the second frequency is prioritized over the first frequency, some UEs reselecting from another over-loaded cell operating over a third frequency may reselect the over-loaded small cell associated with the second, higher priority frequency rather than the under-loaded small cell associated with the first, lower priority frequency. This may lead to under-utilization of under-loaded small cells.

Moreover, in environments in which a large number of UEs transition from RRC Idle mode to RRC Connected mode within a relatively short amount of time, such as at the end of a concert or sports event, the use of prioritized frequencies when the UEs are idle, the UEs may tend to camp on the same frequency layer and hence overload the same cell. This can be caused by partial alignment of small cells or when one small cell is in low frequency, thus resulting in different signal quality.

Figure 3:
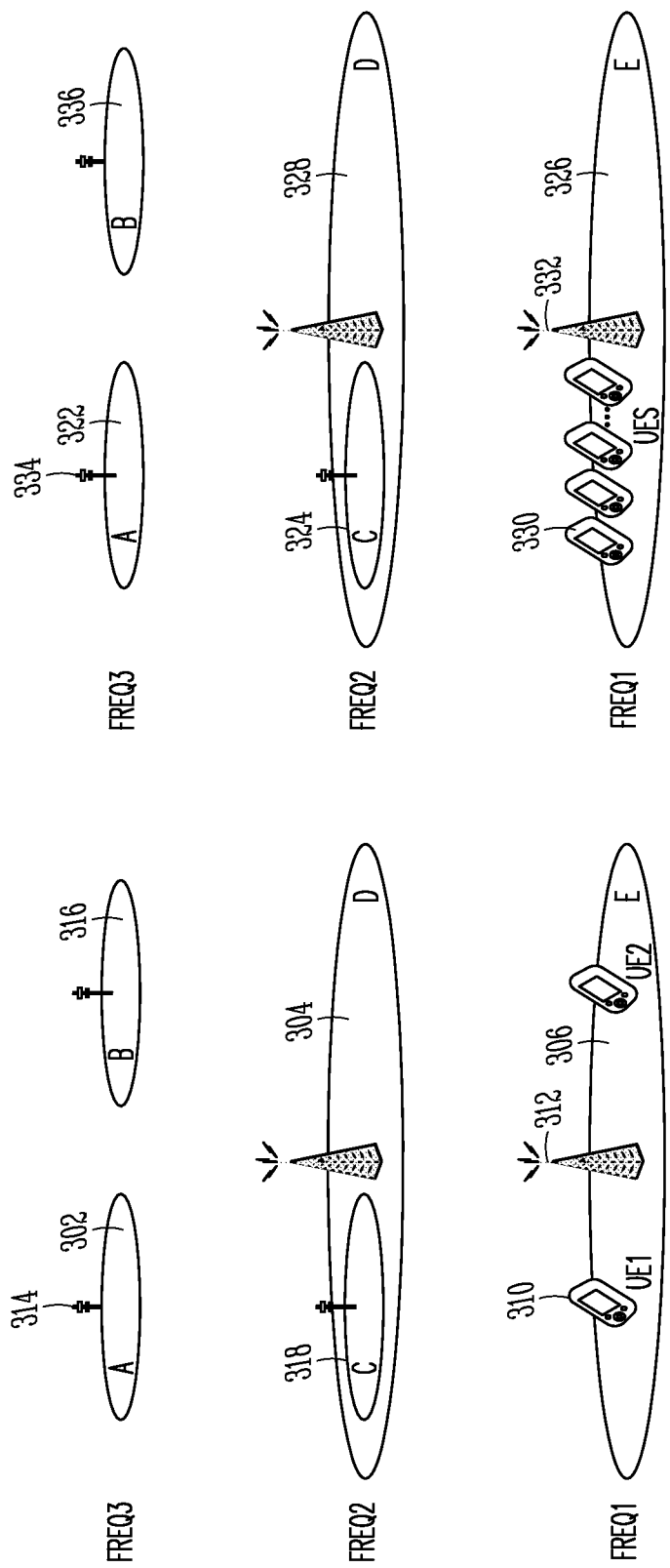
FIGS. 3A and 3B illustrate examples of cells and associated loadings in accordance with some embodiments.

As the above examples show, it would be desirable during the reselection process to distribute the UEs uniformly across multiple cells or frequencies. To begin, FIGS. 3A and 3B illustrate examples of cells and associated loadings in accordance with some embodiments. FIG. 3A includes overloaded cells 302, 304, 306 and under-loaded cells 316, 318. Each of the cells 302, 304, 306, 316, 318 may contain an eNB 312, 314. In some embodiments, the eNB 314 for the small cells may be an access point or other centralized controller that may have a more limited functionality compared to the eNB 312. The cells 302, 304, 306, 316, 318 may include macro cells (cell D 304, cell E 306) as well as small cells (cell A 302, B 316, C 318).

The cells 302, 304, 306, 316, 318 may also operate on different frequencies. For example, cell E 306 may operate on frequency 1, cells C 318 and D 304 may operate on frequency 2 and small cells A 302 and B 316 may operate on frequency 3. Small cell C 318 operating on frequency 2 may geographically overlap macro cell D 304 operating on the same frequency. Small cells A 302 and B 316 operating on frequency 3 may also geographically overlap macro cell D 304 and may avoid overlapping (or may only partially overlap) each other.

UEs 310 may be attached to cell E 306 and may geographically overlap macro cell D 304. Moreover, UE1 may geographically overlap small cells A 302 and C 318 while UE2 may geographically overlap small cell B 316. Other UEs may be attached to others of the cells 302, 304, 306, 316, 318 but are not shown for convenience. UEs 310 in cell E 306 may be in the RRC Idle mode or RRC Connected mode. As shown, cells A 302, D 304, and E 306 may be over-loaded, while small cells B 316 and C 318 may be under-loaded. Thus, the under-loaded cells may be small cells that do not overlap either geographically or in frequency.

Similarly, FIG. 3B shows an embodiment in which under-loaded cells and cells containing varying levels of loads. Specifically, as shown, the cells 322, 324, 326, 328, 336 may include under-loaded cells 322, 324 and cells 326, 328, 336 having an increasing load. Each of the cells 322, 324, 326, 328, 336 may contain an eNB 332 or access point 334 or other central communication coordinator. The cells 322, 324, 326, 328, 336 may include macro cells (cell D 328, cell E 326) as well as small cells (cell A 322, B 336, C 324).

The cells 322, 324, 326, 328, 336 may also operate on different frequencies. As above, cell E 326 may operate on frequency 1, cells C 324 and D 328 may operate on frequency 2 and cells A 322 and B 336 may operate on frequency 3. Small cell C 324 operating on frequency 2 may overlap macro cell D 328 operating on the same frequency. Small cells A 322 and B 336 operating on frequency 3 may avoid overlapping each other (as shown) or may overlap partially.

As above, UEs 330 may be attached to cell E 326 and may geographically overlap cell D 328. The UEs 330 may all geographically overlap small cells A 322 and C 324 (e.g., be in a concert or sports venue). Other UEs may be attached to others of the cells 322, 324, 326, 328, 336 but are not shown for convenience. UEs 330 in cell E 326 may be in the RRC Idle mode or RRC Connected mode.

As shown in FIGS. 3A and 3B, it may be desirable for one or more of the UEs 310, 330 to use an under-loaded cell. If the UEs are in RRC Connected mode, the UE or eNB may be trigger a handover of the UE. In RRC Idle mode, however, handover is not available. The RRC Idle mode UE may measure Signal-to-Interference-plus-Noise Ratio (SINR), Reference Signal Received Power (RSRP) and/or Reference Signal Received Quality (RSRQ) for the serving cell. If the SINR/RSRP/RSRQ is poor or undetectable, the UE may search for another cell. If the SINR/RSRP/RSRQ is measurable, the UE may use Cell Reselection Criteria to determine whether or not to perform reselection.

Even if the SINR/RSRP/RSRQ is reasonable, it may be desirable for idle mode UEs to reselect from the current serving cell to an under-loaded cell to minimize delay and signaling overhead when the UEs enter the RRC Connected mode and wind up being handed over due to overloading of the serving cell. In some embodiments, a reselection priority rule may be enabled using a system information broadcast (SIB); in particular the eNB may broadcast a cellReselectionPriority in the SIB, which specifies the absolute priority for each frequency. In response to receiving the SIB, the UE may measure and reselect a cell with a higher frequency priority than frequency used by the currently serving cell if a minimum signal requirement is met. In some embodiments, the reselection priority rule may use a dedicated priority list that is configured when the UE is in the RRC Connected mode and used in RRC Idle mode. In such embodiments, if the loading situation changes or the UE reselects another cell in a frequency that is not a dedicated priority due to reselection criteria not being met, the eNB may wait until the next time the UE enters the RRC Connected mode before the eNB is able to change the dedicated priority in the UE. In some embodiments, the reselection priority rule may involve the eNB configuring the UE with a cell-specific offset, in which one or more cells are prioritized over other cells. The use of a cell-specific priority list may lead to cell edge UEs experiencing poor channel quality. In some embodiments, the reselection priority rule may result from the eNB performing load balancing when the UE is in connected mode. This may, however, introduce delay and increase the possibility of handover failure.

Figure 4:
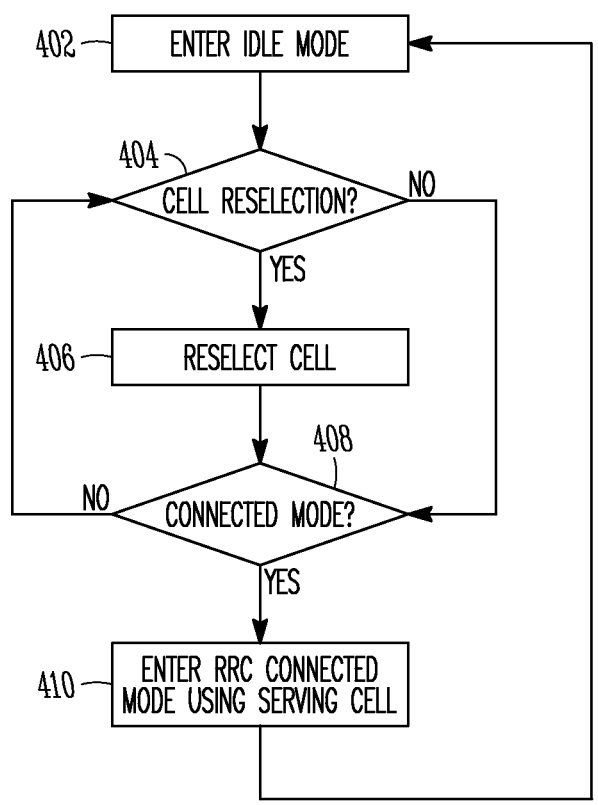
FIG. 4 illustrates a flowchart of cell reselection in accordance with some embodiments.

To better facilitate the reselection process, a cell-specific priority probability (CSPP) may be added during reselection. FIG. 4 illustrates a flowchart of cell reselection in accordance with some embodiments. At operation 402, a UE in the RRC Connected mode may enter the RRC Idle mode.

At operation 404, the UE, while in RRC Idle mode, may determine whether cell reselection is appropriate. The UE may measure the SINR/RSRP/RSRQ of the current eNB (or controller) to which it is attached and may also measure the SINR/RSRP/RSRQ of the other eNBs or controller. Based on the SINR/RSRP/RSRQ measurement, the UE may use a predetermined set of cell reselection criteria to determine whether or not to perform cell reselection. At least some of the cell reselection criteria, such as the cell reselection priority may be provided to the UE prior to entering the RRC Idle mode, or may be provided to the UE (or updated) via system broadcast information.

In response to determining that cell reselection is desirable, the UE may determine which cell to reselect at operation 406. To make this determination, the UE may use a cell-specific priority list and a cell reselection probability provided by the serving eNB and received by the UE. In some embodiments, the eNB may broadcast this information as part of the system information broadcast.

The cell-specific priority list may include one or more cells having one or more priorities. The priority may be based on any combination of cell type, current load, predicted load and channel conditions. In some embodiments, multiple cells may have the same priority. Thus, in some embodiments all cells may have the same priority; in other embodiments one or more cells may have the same priority while other cells may have at least one different priority. In some embodiments, the UE may randomly select a cell among cells having the same priority. In some embodiments, the eNB may assign a limited number of priorities such that cells having one or a combination of conditions are within a predetermined range (e.g., loads within 5-10%, channel conditions within 10-15% dB interference) are assigned the same priority. For example, a cell that is 30% loaded may be assigned the same priority as a cell of the same type that is 38% loaded if fewer than 10 priorities are assigned.

The UE may then use the cell reselection probability to determine if the UE should perform cell reselection or not. In some embodiments, the UE may generate a random number and compare the random number with the cell reselection probability to determine whether or not the UE will perform cell reselection. In some embodiments, if the random number is smaller than the cell reselection probability, the UE may remain attached to the serving cell on the current frequency. Otherwise, the UE may perform cell reselection based on the cell specific priority list. In some embodiments, the UE may remain attached to the serving cell in response to determining that the random number is larger than the cell reselection probability. In some embodiments, the comparison between the random number and the cell reselection probability may be performed by the UE prior to random selection among cells having the same priority, thereby reducing the amount of processing used by the UE.

The UE may comprise one or more timers, e.g. in the processing circuitry, configured to control when the UE is to check the system information related to load balancing information and perform load balancing to reduce power consumption. In this case, one of the timers may increment from an initial value at the immediately preceding cell reselection procedure (whether or not the UE reselects) to reach a predetermined value, at which point the UE may read the system information, and then reset to the initial value, with the UE refraining from reading system information at least related to cell reselection therebetween. In some embodiments, the cell reselection probability and/or cell-specific priority list may be updated periodically by the eNB such one or both may change between system broadcasts. The update may be based on loading of the different cells available. In some embodiments, the cell reselection probability and/or cell-specific priority list may be determined using a predictive algorithm to determine the predicted load on the various cells prior to the next update using the current cell loading. The predictive algorithm may take into account, for example, whether the number of UEs likely to switch to a particular cell (from one or more of the neighboring eNBs) and/or the load on the particular cell has changed between system broadcasts to all of the UEs.

At least some of the information used to generate the priority at a selected eNB may be obtained from communication with neighboring eNBs, e.g., via the X2 interface, prior to each update transmitted by the selected eNB. In some embodiments, the cell reselection probability and/or cell-specific priority list may initially be transmitted through higher layer signaling when the UE is in the RRC Connected Mode, prior to the UE entering the RRC Idle mode. For example, the cell reselection probability may be transmitted separately from the cell-specific priority list, e.g., the cell reselection probability may be transmitted when the UE is the RRC Connected Mode while the cell-specific priority list may be transmitted when the UE is in the RRC Idle Mode. In some embodiments, if the eNB pages a particular UE, so that the UE enters the RRC Connected Mode, the eNB may at that time update the cell reselection probability and/or cell-specific priority list for the particular UE.

In some embodiments, the eNB may broadcast a cell-specific priority list that contains all cells. In some embodiments, the eNB may broadcast a cell-specific priority list that contains only those cells that are below a cell load threshold. In some embodiments, each cell may have a maximum load threshold that is independent of the load of the neighboring cells. The maximum load threshold may be the same for each cell, may be the same for each type of cell (e.g., macro, micro), or may be entirely independent of each other. In this case, the eNB may broadcast a cell-specific priority list that contains only cells whose cell load is less than the maximum load threshold. Thus, in some embodiments, the cell-specific priority list may contain only cells whose load is less than the load of the serving cell, while in other embodiments the cell-specific priority list may contain only cells whose load is less than the maximum load threshold (which may be, e.g., a percentage of the full load of the particular cell).

In some embodiments, each cell may have a minimum load difference threshold, in which the load difference is relative to the load of the neighboring cells. The minimum load difference threshold may be the relative % difference of loading of each cell compared with the loading of the serving cell. The minimum load difference threshold may be a percentage that is the same for each cell, may be the same for each cell of the same type (e.g., macro, micro) or may be entirely independent for each cell. In this case, the eNB may broadcast a cell-specific priority list that contains only cells whose relative cell load is greater than the minimum load difference threshold. For example, if the serving cell has a cell load of 75% and a first neighboring cell has a cell load of 25%, the difference is 50% and thus the first neighboring cell may be included if the minimum load difference threshold is less than 50%.

Thus, given a large number of UEs, only a percentage about that of the cell reselection probability may perform cell reselection using the cell-specific priority list. In the example shown in FIG. 3A, the eNB serving the UEs may broadcast on frequency 1 a higher priority for under-loaded cells B and C than over-loaded cell A, D and E. As there are few UEs that are to reselect, the reselection probability may in this case be configured to 0 so that all of the UEs perform cell reselection. In this case, in FIG. 3A UE1 may reselect to cell C and UE 2 may reselect to cell D if frequency priority is used; while if CSPP is used, UE1 may reselect to cell C and UE 2 may reselect to cell B due to the geographic overlap. In other embodiments, if cells B and C both serve UE1 and UE2, as shown in FIG. 3B, UE 1 may randomly reselect to one of cells B and C, while UE 2 may randomly reselect to the other of cells B and C. In some embodiments, the random assignment may be further skewed towards a particular cell having equal probability. For example, the skew may be effected by having the UE generate a second random number if a particular cell is assigned and having meet a predetermined secondary criterion (e.g., be less than a secondary number); and if the second random number does not meet the predetermined secondary criterion, having the UE again randomly reselect the cell.

In the example shown in FIG. 3B, in which a large number of UEs are being served by serving cell E, the eNB serving the UEs may broadcast on frequency 1 a priority ($P_x$) for each cell X where $P_A = P_C > P_E > P_D > P_B$, reflecting the load level of the different cells. In some embodiments, the UEs may be limited to reselect only cells having a load less than the load of the serving cell (and thus a higher priority than the serving cell). The reselection probability may be configured to 0.8, i.e., 80% of the UEs may be expected to perform cell reselection and 20% of the UEs may remain in cell E. Of the 80% of the UEs that perform cell reselection, if the UEs are limited to reselect only cells having a load less than that of cell E, the UEs may reselect only to cell A or cell C. Thus, if the cells are selected randomly, after reselection, 20% of the UEs may remain in cell E, 40% of the UEs may reselect to cell A and 40% of the UEs may reselect to cell C.

In some embodiments, the UE may randomly select among the eNBs in the list of eNBs proportional to the priority of each of the eNBs. For example, if $P_A=P_C=10$, $P_E=4$, $P_D=1$ and $P_B=0$ (i.e., only cell B is overloaded), of the UEs performing reselection, 40% of the UEs may reselect to cell A, 40% of the UEs may reselect to cell C, 16% of the UEs may reselect to cell E and 4% of the UEs may reselect to cell D. In this case, in some embodiments, the priority of each of the eNBs in the list of eNBs may take into account loading of the eNBs after reselection. Thus, the serving eNB may determine an initial priority for each eNB and modify the priorities of each of the eNBs based on the load of the eNBs after potential reselection by the UEs served by the serving eNB. The updated priorities of each of the eNBs in the list of eNBs may be transmitted to the UE after one or more iterations of this process.

After reselection, the UE may determine whether it is to enter the RRC Connected mode at operation 408. The UE may determine that it is to enter RRC Connected mode in response to a RRC connection establishment procedure initiated by the UE or triggered by either the UE or the network. For example, the UE may trigger RRC connection establishment in response to starting an app on the UE or moving into a new Tracking Area and to complete the Tracking Area Update signaling procedure. The network may trigger the RRC connection establishment procedure by sending a Paging message to the UE indicating a system update or incoming data for the UE.

If the UE determines that it is to remain in the RRC Idle mode, the UE may return to operation 404. Otherwise, the UE may enter RRC Connected mode at operation 410. The UE may communicate data, such as voice or video data, with other UEs through the serving eNB or directly, via device-to-device (D2D) communications.

In some embodiment, the UE may receive the system information and identify whether or not the priority of at least one of the neighboring cells has a cell priority higher than the serving cell priority. If the cell priority is higher, the UE may determine whether or not a signal of the higher priority cell satisfies cell reselection criteria. If the signal of the higher priority cell satisfies the cell reselection criteria, the UE may reselect to that cell. If the signal of the higher priority cell does not satisfy the cell reselection criteria, the UE may determine whether or not a second highest priority cell exists and, if so, whether or not a signal from the second highest priority cell satisfies the cell reselection criteria. This may continue until the cell reselection criteria is met by one or more cells having a cell priority higher than the serving cell priority. The UE may then reselect to one of the cells having a cell priority higher than the serving cell priority and meeting the cell reselection criteria. If the UE determines that no cell having a cell priority higher than the serving cell priority and meeting the reselection criteria is present, the UE may refrain from performing reselection.

Figure 5A:
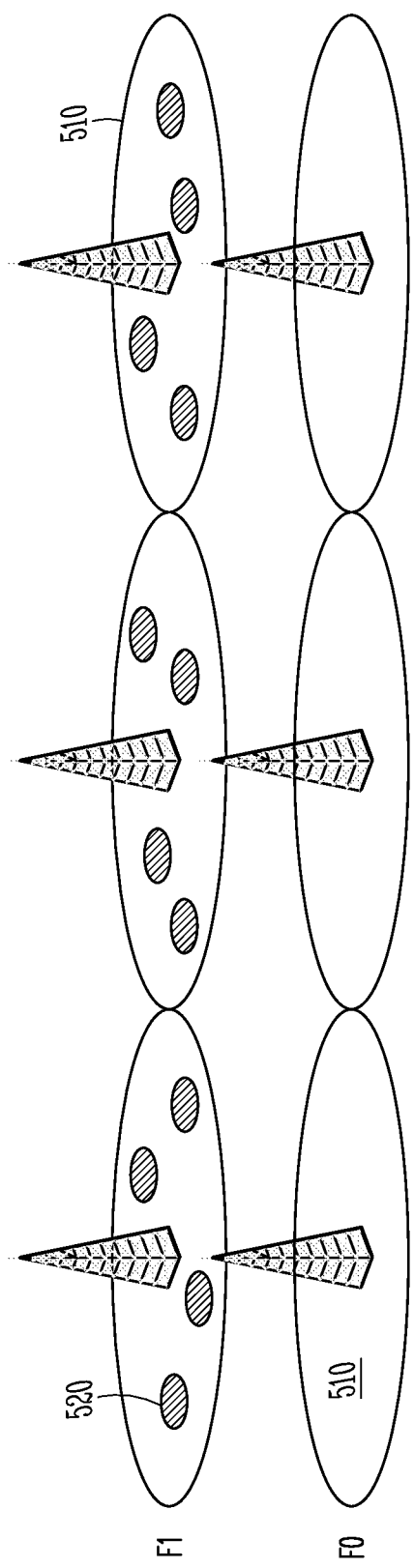
FIGS. 5A-5I illustrate simulations of different cell reselection techniques in accordance with some embodiments.
Figure 5B:
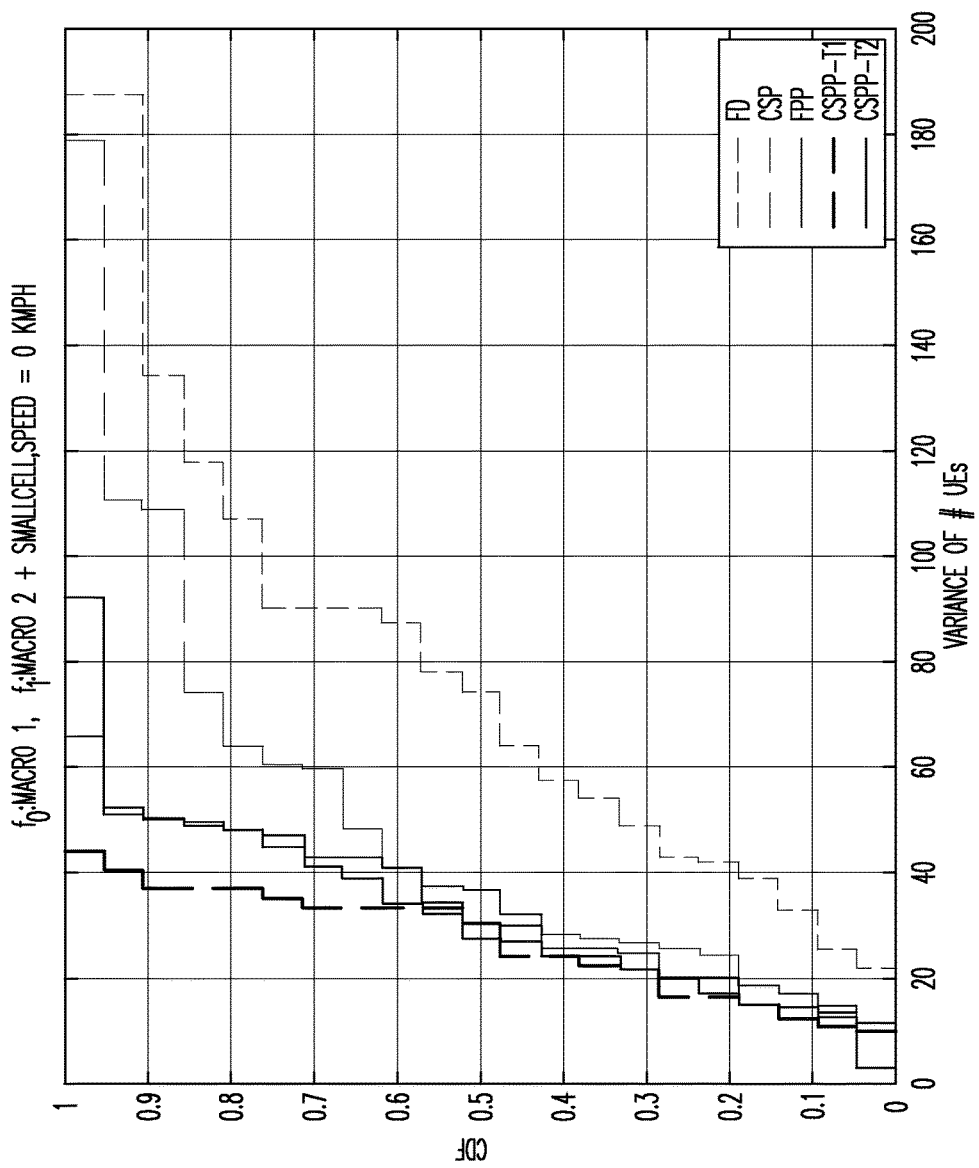
Figure 5C:
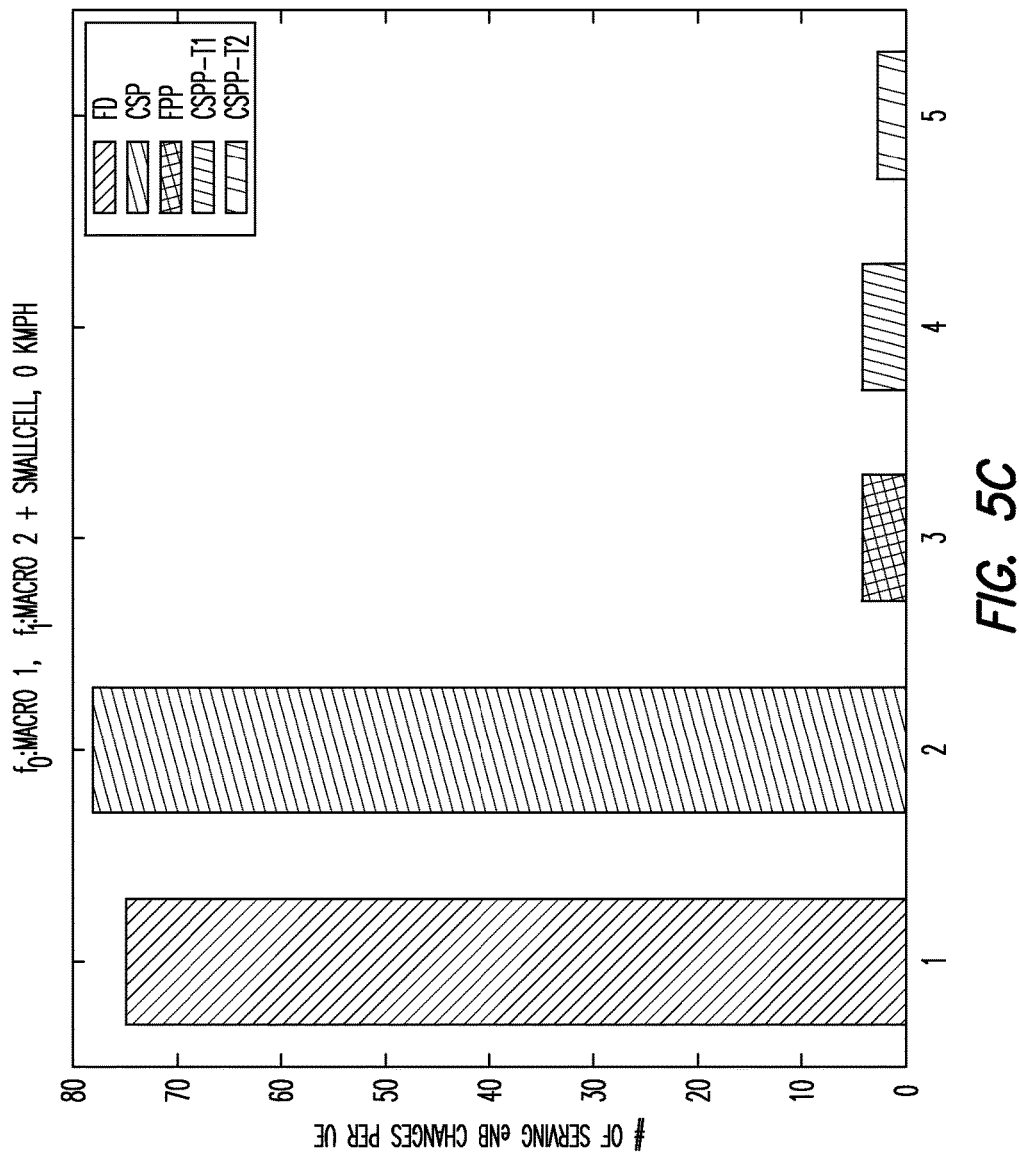
Figure 5D:
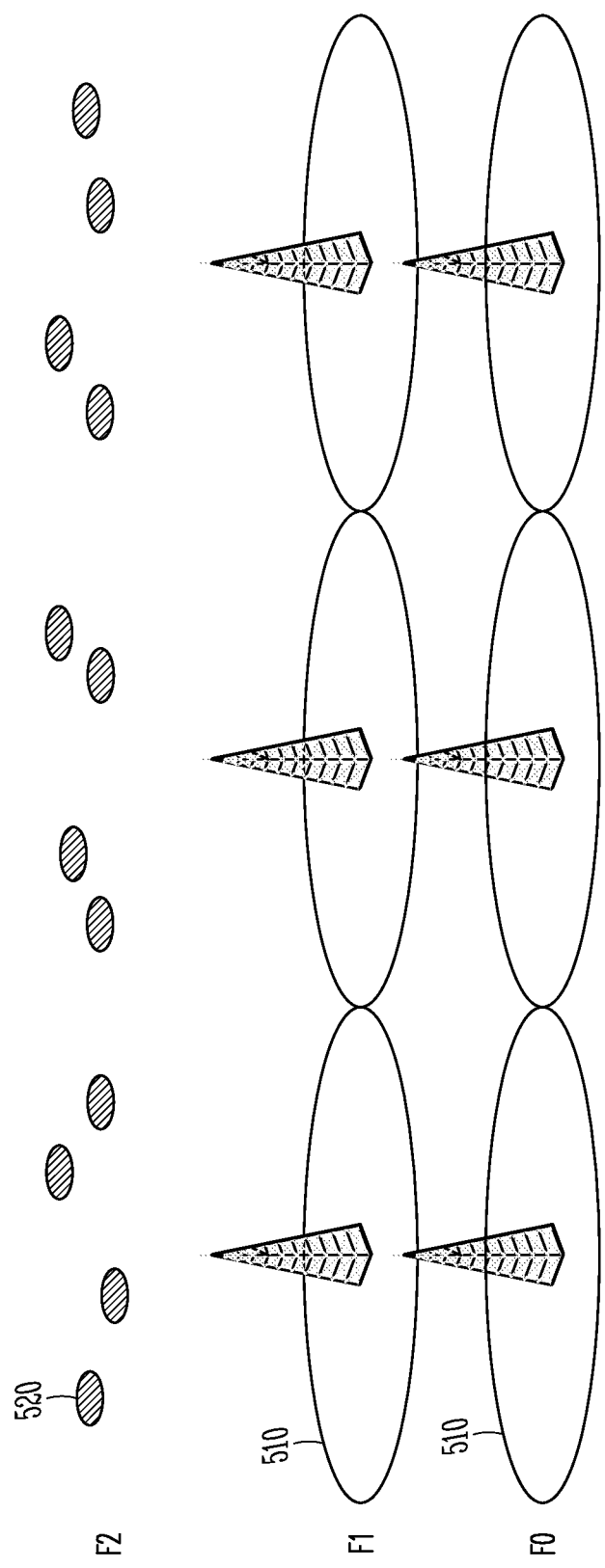
Figure 5E:
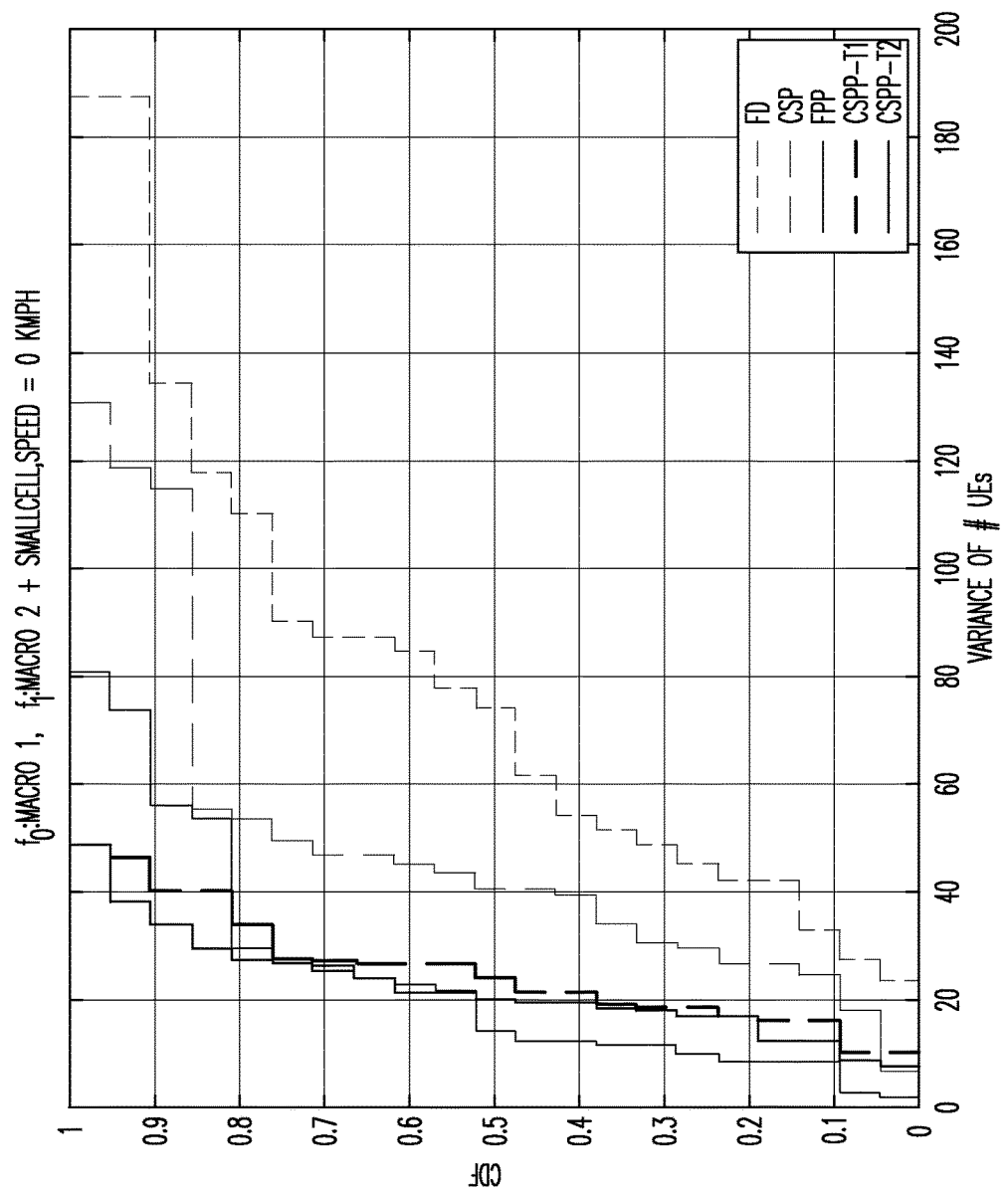
Figure 5F:
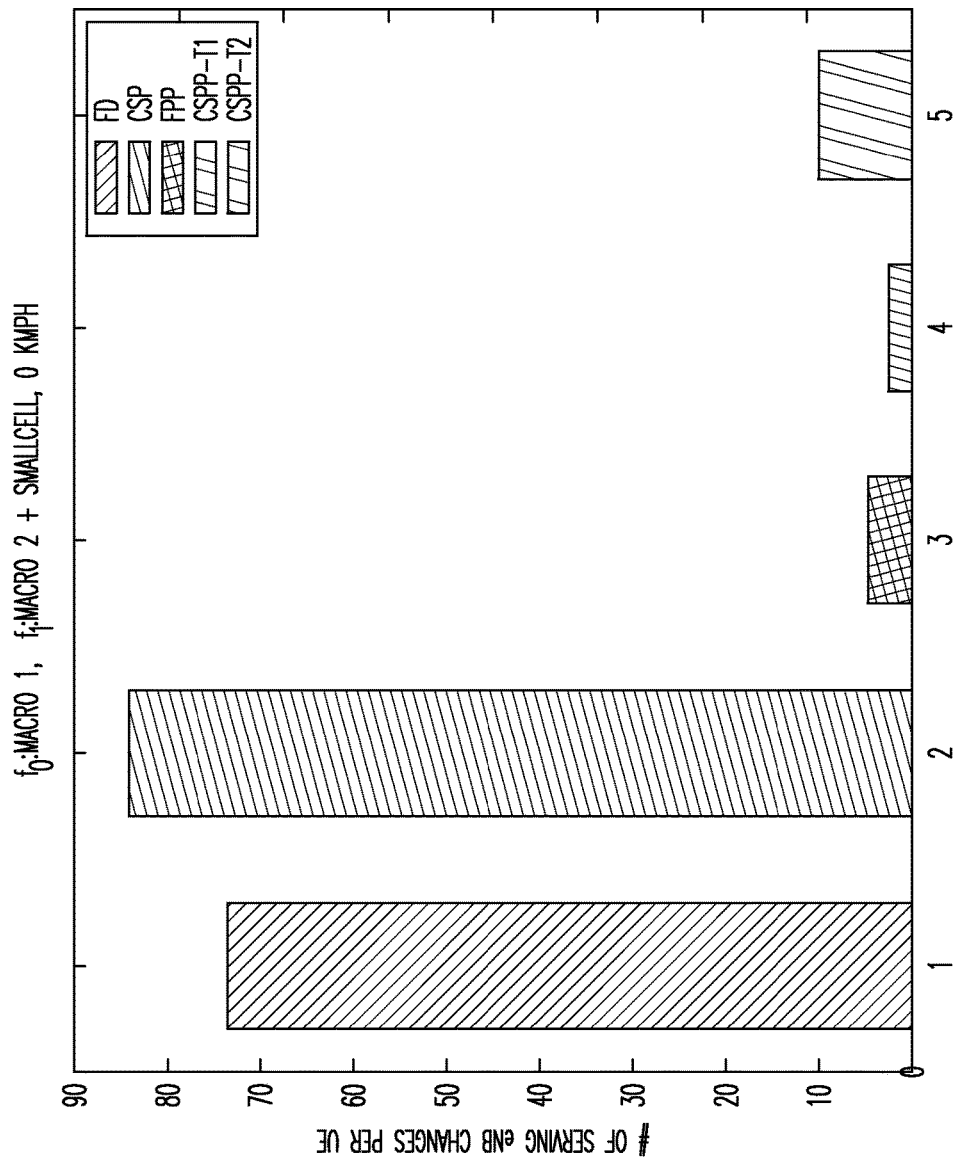
Figure 5G:
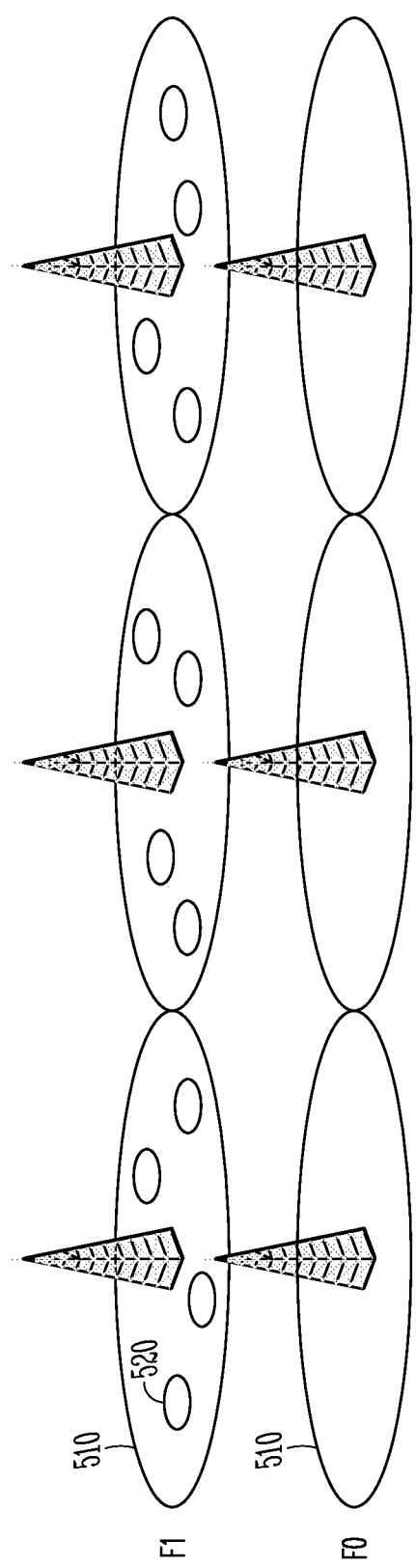
Figure 5H:
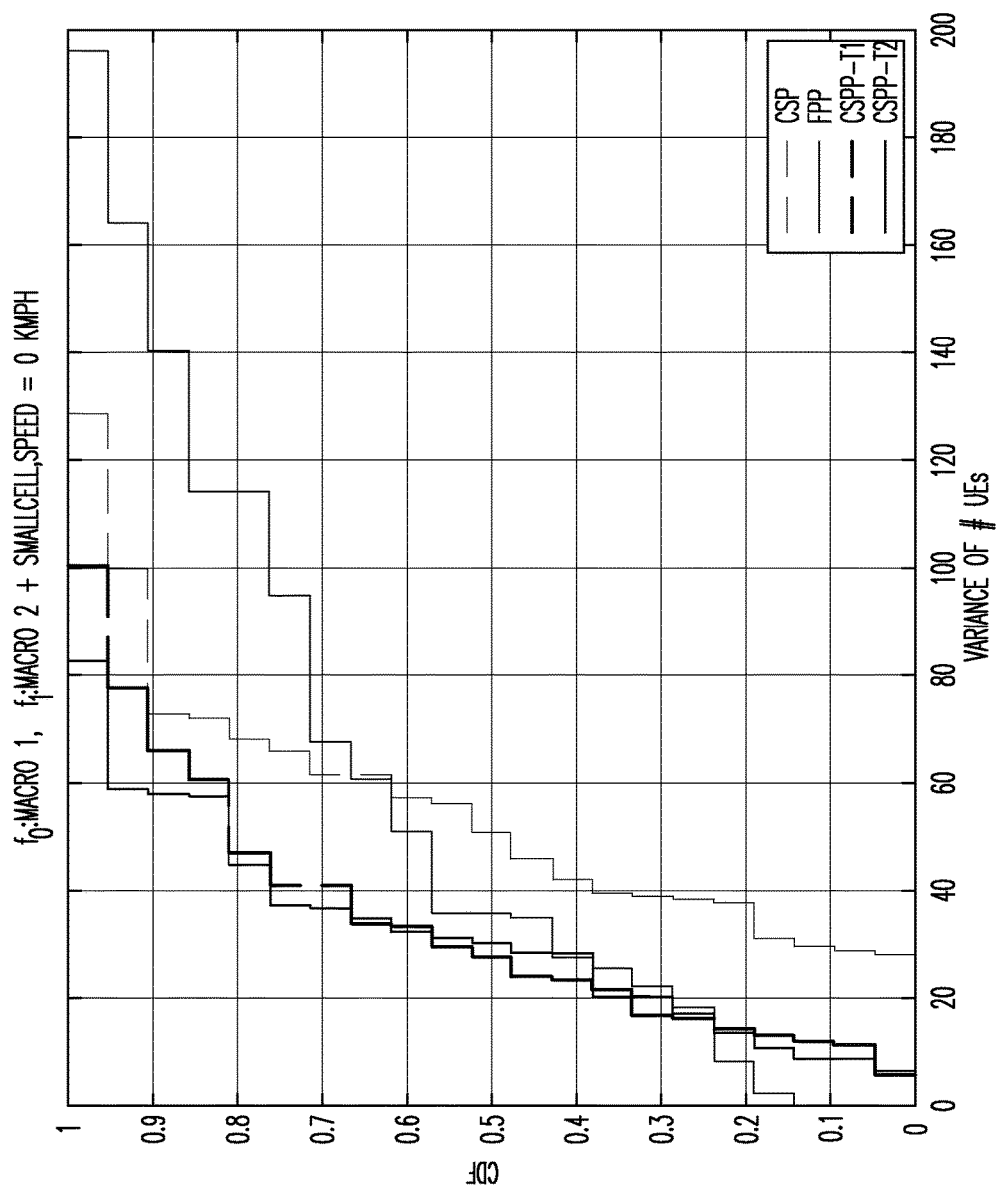
Figure 5I:
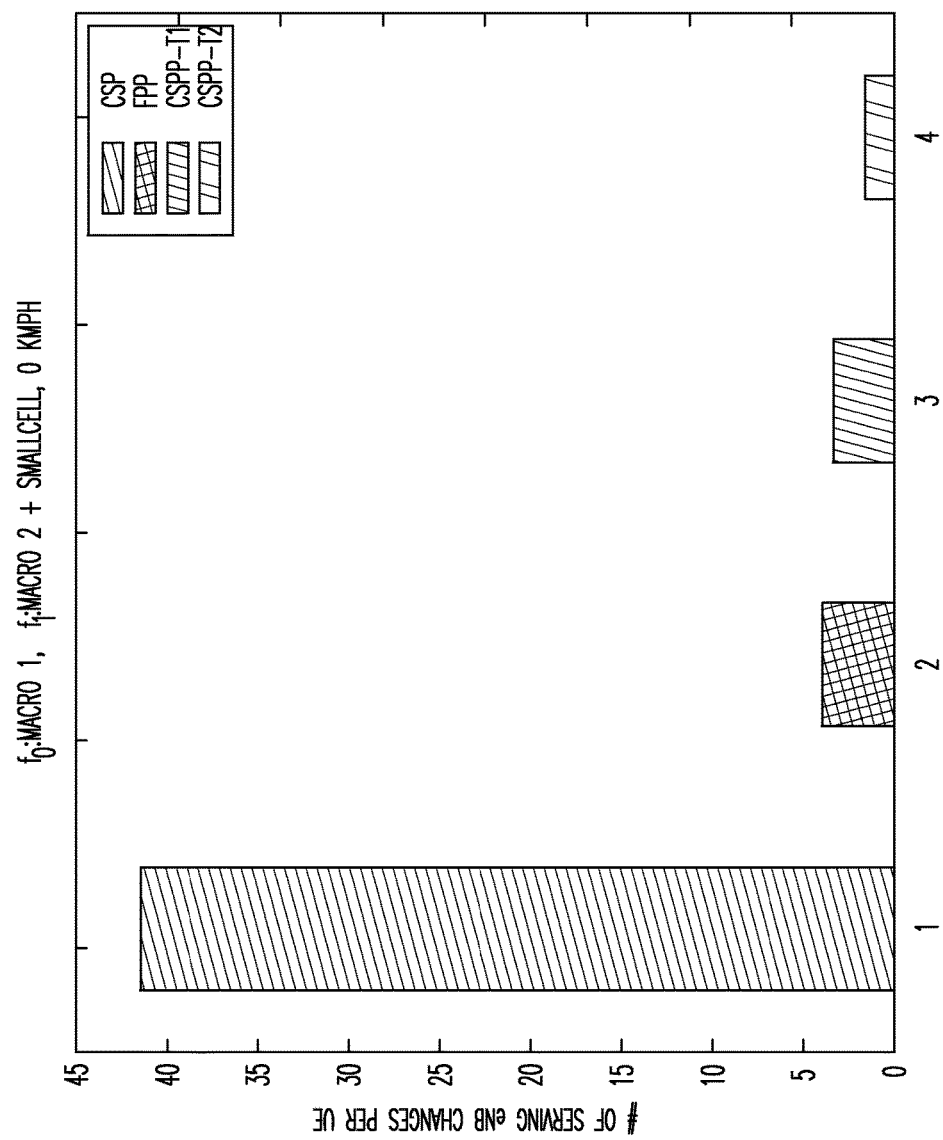

Simulations of different scenarios were made for performance evaluation. FIGS. 5A-5I illustrate simulations of different cell reselection techniques in accordance with some embodiments. In a first scenario, shown in FIG. 5A, macro cells 510 and small cells 520 were deployed in different frequencies, with the macro cells 510 deployed in and aligned between frequency 0 and 1 and the small cells 520 deployed in frequency 1 randomly within each macro cell. The results of the first scenario, described below, are shown in FIGS. 5B and 5C. A second scenario, shown in FIG. 5D, was similar to the first scenario, except that the small cells are deployed in frequency 2 rather than randomly in each macro cell. The results of the second scenario are shown in FIGS. 5E and 5F. A third scenario, shown in FIG. 5G, was again similar to the first scenario, except that the macro cells were offset from each other between the different frequencies. A number of UEs were introduced to the macro cell in frequency 0 (without any small cells). The results of the third scenario are shown in FIGS. 5H and 5I. In each scenario, the source eNB broadcast the priority in the system information block (SIB). The UEs read the SIB and performed cell reselection accordingly. Each UE performed measurement and reselected to a higher priority cell/frequency only if the higher priority cell/frequency satisfied the cell reselection criteria. A load distribution scheme using frequency priority, cell-specific priority, frequency priority with probabilities, cell specific priority probability and cell specific priority probability with cell load threshold (in which the eNB only broadcasts cells in the cell-specific priority if the cell load is under a predetermined threshold).

The cumulative distribution function (CDF) of the variance of the number of the UEs across different eNBs was examined for all scenarios as shown in FIGS. 5B, 5E and 5H. The smaller the variance, the better distributed the UEs. The frequency priority (FP) was found to perform the worst while both cell specific priority (CSP) and frequency priority probability (FPP) was found to improve the distribution significantly. Cell specific priority probability (CSPP-T1) was found to perform the best in terms of distributing UEs across different cells.

The number of cell changes per UE, which leads to increased overhead and power consumption of the UE, was also examined and the results shown in FIGS. 5C, 5F and 5I. FP and CSP were each found to have a relatively high number of cell changes, while FPP and CSPP were each found to have fewer cell changes. In the simulation, slow and high mobility (relative to the macro cell size) UEs were examined and the results are similar.

Various examples of the disclosure are provided below. These examples are not intended to in any way limit the disclosure herein. In Example 1, user equipment (UE) may comprise processing circuitry configured to: configure a transceiver to receive a cell-specific priority list and a cell reselection probability from a serving eNode B (eNB) to which the UE is attached, the cell-specific priority list comprising a list of neighboring eNBs of the serving eNB, each eNB in the list having an associated priority based at least in part on load of the eNB, the cell reselection probability indicating a probability that the UE is to reselect to one of the eNBs in the list of eNBs; reselect to a selected eNB in the list of eNBs based on the cell-specific priority list and the cell reselection probability in response to a determination that the UE is to reselect; and configure the transceiver to communicate with the selected eNB after reselection of the selected eNB.

In Example 2, the subject matter of Example 1 can optionally include that the processing circuitry is further configured to configure the UE to enter a Radio Resource Control (RRC) Idle mode prior to a determination of whether or not to reselect and configure the UE to exit the RRC Idle mode and enter a RRC Connected mode prior to communicating with the selected eNB.

In Example 3, the subject matter of one or any combination of Examples 1-2 can optionally include that the processing circuitry is further configured to configure the UE to enter the RRC Idle mode prior to the transceiver receiving the cell-specific priority list and the cell reselection probability from the eNB.

In Example 4, the subject matter of one or any combination of Examples 1-3 can optionally include that the list of neighboring eNBs is limited to a list of eNBs having a higher priority than the serving eNB.

In Example 5, the subject matter of one or any combination of Examples 1-4 can optionally include that the list of neighboring eNBs is further limited to a list of eNBs having a highest priority.

In Example 6, the subject matter of one or any combination of Examples 1-5 can optionally include that the processing circuitry is further configured to select among the eNBs in the list of eNBs proportional to a priority of each of the eNBs.

In Example 7, the subject matter of one or any combination of Examples 1-6 can optionally include that the processing circuitry is further configured to randomly select among eNBs in the list of eNBs that have a same priority when the priority is a highest priority among the eNBs in the list of eNBs.

In Example 8, the subject matter of one or any combination of Examples 1-7 can optionally include that the list of neighboring eNBs is limited to a list of eNBs having a load less than a load of the serving eNB such that the UE is restricted from being able to reselect to a neighboring eNB having a load greater than the load of the serving eNB.

In Example 9, the subject matter of one or any combination of Examples 1-8 can optionally include that the processing circuitry is further configured to the list of neighboring eNBs comprises macro and small cells operating on at least one frequency different from a frequency on which the serving eNB operates.

In Example 10, the subject matter of one or any combination of Examples 1-9 can optionally include that the processing circuitry is further configured to configure the transceiver to receive the cell-specific priority list and the cell reselection probability from the eNB via a system information broadcast (SIB).

In Example 11, the subject matter of one or any combination of Examples 1-10 can optionally include that the processing circuitry is further configured to measure at least one of Signal-to-Interference-plus-Noise Ratio (SINR), Reference Signal Received Power (RSRP) and Reference Signal Received Quality (RSRQ) of the serving eNB and compare the at least one of RSRP and RSRQ to a predetermined set of cell reselection criteria to determine whether or not to perform reselection.

In Example 12, the subject matter of one or any combination of Examples 1-11 can optionally include that the processing circuitry is further configured to configure the transceiver to receive the predetermined set of cell reselection criteria prior to entering a Radio Resource Control (RRC) Idle mode.

In Example 13, the subject matter of one or any combination of Examples 1-12 can optionally include that the processing circuitry is further configured to configure the transceiver to receive the predetermined set of cell reselection criteria via system broadcast information after entering a Radio Resource Control (RRC) Idle mode.

In Example 14, the subject matter of one or any combination of Examples 1-13 can optionally include that the processing circuitry is further configured to generate a random number and compare the random number with the cell reselection probability to determine whether or not to perform reselection.

In Example 15, the subject matter of one or any combination of Examples 1-14 can optionally include that the processing circuitry is further configured to configure a timer to increment from an initial value at an immediately preceding cell reselection, configure the transceiver to read system information related to cell reselection in response to the timer reaching a predetermined value, configure the timer to reset to the initial value after the system information is read, and configure the transceiver to refrain from reading the system information prior to the timer reaching the predetermined value.

In Example 16, the subject matter of one or any combination of Examples 1-15 can optionally include an antenna configured to transmit and receive communications between the transceiver and the eNB.

In Example 17, an apparatus of an eNB may comprise processing circuitry configured to configure a transceiver to transmit cell reselection information to each of a plurality of UEs attached to the eNB, the cell reselection information transmitted to a particular UE comprising at least one of: a cell-specific priority list comprising a list of neighboring eNBs of the eNB, each eNB in the list having an associated priority based at least in part on load of the eNB, and a cell reselection probability indicating a probability that the particular UE is to reselect to one of the eNBs in the list of eNBs.

In Example 18, the subject matter of Example 17 can optionally include that the processing circuitry is further configured to determine whether the particular UE is in a Radio Resource Control (RRC) Idle mode; and configure the transceiver to transmit the cell reselection information to the particular UE in response to determining that the particular UE is in the RRC Idle mode.

In Example 19, the subject matter of one or any combination of Examples 17-18 can optionally include that the list of neighboring eNBs is limited to a list of eNBs having a higher priority than the eNB such that the UEs are restricted from being able to reselect to a neighboring eNB having a load greater than the load of the eNB.

In Example 20, the subject matter of one or any combination of Examples 17-19 can optionally include that the cell reselection information is configured to permit the UE to randomly select among eNBs in the list of eNBs that have a same priority.

In Example 21, the subject matter of one or any combination of Examples 17-20 can optionally include that the list of neighboring eNBs is limited to a list of eNBs having a load less than a load of the eNB such that the UEs are restricted from being able to reselect to a neighboring eNB having a load greater than the load of the eNB.

In Example 22, the subject matter of one or any combination of Examples 17-21 can optionally include that the list of neighboring eNBs comprises macro and small cells operating on at least one frequency different from a frequency on which the eNB operates.

In Example 23, the subject matter of one or any combination of Examples 17-22 can optionally include that the processing circuitry is further configured to configure the transceiver to transmit the cell reselection information from the eNB via a system information broadcast (SIB).

In Example 24, the subject matter of one or any combination of Examples 17-23 can optionally include that the processing circuitry is further configured to configure the transceiver to transmit to the particular UE a predetermined set of cell reselection criteria to enable the particular UE to determine whether or not to perform reselection.

In Example 25, a non-transitory computer-readable storage medium that stores instructions for execution by one or more processors of a UE to configure the UE to communicate with an eNB, the one or more processors may configure the UE to: receive, in a system information broadcast (SIB) from a serving eNode B (eNB) to which the UE is attached while the UE is in a Radio Resource Control (RRC) Idle mode, at least one of: a cell-specific priority list comprising a list of neighboring eNBs of the serving eNB, each eNB in the list having an associated priority based at least in part on load of the eNB, and a cell reselection probability indicating a probability that the UE is to reselect to one of the eNBs in the list of eNBs; determine whether or not the UE is to reselect to an eNB in the list of eNBs; and reselect to a selected eNB in the list of eNBs based on the cell-specific priority list and the cell reselection probability in response to determining that the UE is to reselect.

In Example 26, the subject matter of Example 25 can optionally include at least one of: the list of neighboring eNBs is limited to a list of eNBs having at least one of a higher priority than the serving eNB and a load less than a load of the serving eNB, and the instructions further configure the one or more processors to configure the UE to at least one of: randomly select among eNBs in the list of eNBs that have a same priority when the priority is a highest priority among the eNBs in the list of eNBs, and generate a random number and compare the random number with the cell reselection probability to determine whether or not to perform reselection.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus of a user equipment (UE) comprising:
   a transceiver; and
   processing circuitry configured to:
      configure the transceiver to receive a cell-specific priority list and a cell reselection probability from a serving eNode B (eNB) to which the UE is attached, the cell-specific priority list comprising a list of neighboring eNBs of the serving eNB, each eNB in the list having an associated priority based at least in part on load of the eNB, the cell reselection probability indicating a probability that the UE is to reselect to one of the eNBs in the list of eNBs;
      reselect to a selected eNB in the list of eNBs based on the cell-specific priority list and the cell reselection probability in response to a determination that the UE is to perform cell reselection;
      configure the transceiver to communicate with the selected eNB after reselection to the selected eNB;
      configure a timer to increment from an initial value at a time of a preceding cell reselection determination;
      configure the transceiver to receive system information related to the cell reselection in response to the timer reaching a predetermined value and refrain from reading the system information prior to the timer reaching the predetermined value; and
      configure the timer to reset to the initial value after the system information is read.

2. The apparatus of claim 1, wherein the processing circuitry is further configured to:
   configure the UE to enter a Radio Resource Control (RRC) Idle mode prior to a determination of whether or not to reselect; and
   configure the UE to exit the RRC Idle mode and enter a RRC Connected mode prior to communicating with the selected eNB.

3. The apparatus of claim 2, wherein the processing circuitry is further configured to:

configure the UE to enter the RRC Idle mode prior to the transceiver receiving the cell-specific priority list and the cell reselection probability from the eNB.

4. The apparatus of claim 1, wherein:
the list of neighboring eNBs is limited to a list of eNBs having a higher priority than the serving eNB.

5. The apparatus of claim 4, wherein:
the list of neighboring eNBs is further limited to a list of eNBs having a highest priority.

6. The apparatus of claim 1, wherein the processing circuitry is further configured to:
select among the eNBs in the list eNBs proportional to a priority each of the eNBs.

7. The apparatus of claim 1, wherein the processing circuitry is further configured to:
randomly select among highest priority eNBs in the list of eNBs, the highest priority eNBs having a same and highest priority among the eNBs in the list of eNBs.

8. The apparatus of claim 7, wherein the processing circuitry is further configured to:
after random selection among the highest priority eNBs:
generate a random number in response to selection of a first eNB, and
in response to selection of a second eNB, select the second eNB free from generation of the random number,
in response to selection of the first eNB, determine whether the random number meets a secondary criterion, and
in response to failure of the random number to meet the secondary criterion, reselect among the highest priority eNBs.

9. The apparatus of claim 1, wherein:
the list of neighboring eNBs is limited to a list of eNBs having a load less than a load of the serving eNB such that the UE is restricted from being able to reselect to a neighboring eNB having a load greater than the load of the serving eNB.

10. The apparatus of claim 1, wherein:
the list of neighboring eNBs comprises macro and small cells operating on at least one frequency different from a frequency on which the serving eNB operates.

11. The apparatus of claim 1, wherein the processing circuitry is further configured to:
configure the transceiver to receive the cell-specific priority list and the cell reselection probability from the eNB via a system information broadcast (SIB).

12. The apparatus of claim 1, wherein the processing circuitry is further configured to:
measure at least one of Signal-to-Interference-plus-Noise Ratio (SINR), Reference Signal Received Power (RSRP) or Reference Signal Received Quality (RSRQ) of the serving eNB and compare the at least one of SINR, RSRP or RSRQ to a predetermined set of cell reselection criteria to determine whether or not to perform reselection.

13. The apparatus of claim 12, wherein the processing circuitry is further configured to:
configure the transceiver to receive the predetermined set of cells reselection criteria prior to entering a Radio Resource Control (RRC) Idle mode.

14. The apparatus of claim 12, wherein the processing circuitry is further configured to:
configure the transceiver to receive the predetermined set of cell reselection criteria via system broadcast information after entering a Radio Resource Control (RRC) Idle mode.

15. The apparatus of claim 1, wherein the processing circuitry is further configured to:
generate a random number and compare the random number with the cell reselection probability to determine whether or not to perform reselection.

16. The apparatus of claim 1, further comprising an antenna configured to transmit and receive communications between the transceiver and the eNB.

17. The apparatus of claim 1, wherein:
the cell-specific priority list is limited to eNBs that have a load below a maximum load threshold, and
the maximum load threshold is the same for each type of eNB and different for different types of eNBs.

18. The apparatus of claim 1, wherein:
the cell-specific priority list is limited to neighboring eNBs that have a relative load below a minimum load difference threshold, the relative load is a difference in load between the serving eNB and neighboring eNBs, and
the minimum load difference threshold is selected by the serving eNB from a first minimum load difference threshold that is the same for each eNB, a second minimum load difference threshold that is same for each type of eNB and different for different types of eNBs, and a third minimum load difference threshold for each eNB that is independent of the maximum load threshold for each other eNB.

19. The apparatus of claim 1, wherein:
the cell reselection probability is dependent on a number of UEs in the serving eNB.

* * * * *

UNITED STATES PATENT AND TRADEMARK OFFICE
CERTIFICATE OF CORRECTION

PATENT NO. : 9,854,591 B2  
APPLICATION NO. : 14/859633  
DATED : December 26, 2017  
INVENTOR(S) : Yiu et al.

Page 1 of 1

It is certified that error appears in the above-identified patent and that said Letters Patent is hereby corrected as shown below:

In the Claims

In Column 17, Line 12, in Claim 6, after "list", insert --of--

In Column 17, Line 13, in Claim 6, after "priority", insert --of--

In Column 18, Line 11, in Claim 13, delete "cells" and insert --cell-- therefor

Signed and Sealed this  
Twenty-eighth Day of May, 2019

Andrei Iancu  
*Director of the United States Patent and Trademark Office*